US007050801B2

United States Patent
Segal et al.

(10) Patent No.: US 7,050,801 B2
(45) Date of Patent: May 23, 2006

(54) METHOD AND SYSTEM FOR HITLESS WIRELESS ROAMING IN A MOBILE ENVIRONMENT

(75) Inventors: Michael Segal, Saratoga, CA (US); Samuel H. Ezekiel, Saratoga, CA (US); Hugo J. W. Vliegen, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/761,109

(22) Filed: Jan. 19, 2004

(65) Prior Publication Data

US 2005/0160169 A1 Jul. 21, 2005

(51) Int. Cl.
*H04Q 7/20* (2006.01)

(52) U.S. Cl. .................... 455/432.1; 455/431; 455/428

(58) Field of Classification Search ............. 455/432.1, 455/431, 428, 445, 454, 94, 96, 97, 98, 411, 455/426.1
See application file for complete search history.

(56) References Cited

U.S. PATENT DOCUMENTS

| 5,479,484 A | 12/1995 | Mukerjee | |
|---|---|---|---|
| 6,546,425 B1 | 4/2003 | Hanson et al. | 709/227 |
| 6,697,355 B1 | 2/2004 | Lim | 370/352 |
| 2002/0022470 A1* | 2/2002 | Ezuriko | 455/403 |
| 2004/0132516 A1* | 7/2004 | Usui | 455/575.7 |

* cited by examiner

*Primary Examiner*—Joseph Feild
*Assistant Examiner*—S. Smith

(57) ABSTRACT

A method and system for hitless wireless roaming in a mobile environment. The present invention describes a system for wireless connectivity in fast moving trains. The system comprises a router for routing Internet Protocol (IP) communication signals to and from a wireless network. The router is located on an object. A first antenna is also located on the object and is communicatively coupled to the router for transmitting the communication signals to and from a plurality of access points on the wireless network. A second antenna is also communicatively coupled to the router for transmitting the communication signals to and from the plurality of access points. The second antenna is positioned a distance from the first antenna on the object that allows the router continuous access to the wireless network as the first antenna and the second antenna roam through the wireless network while the object is moving.

36 Claims, 4 Drawing Sheets

METHOD AND SYSTEM FOR HITLESS WIRELESS ROAMING IN A MOBILE ENVIRONMENT

BACKGROUND OF THE INVENTION

1. Field of the Invention

Embodiments of the present invention relate to the field of wireless communication. More particularly, embodiments of the present invention relate generally to hitless wireless roaming in a mobile environment.

2. Related Art

Wireless communication in a mobile environment has presented a host of opportunities that are beneficial for the consumer. Wireless cellular technologies allow for increased connectivity to a communication network while on the go. Among the advantages to the consumer are increased productivity as communication for business purposes is possible while in a mobile environment. In addition, wireless cellular technology is popular for making personal calls in a mobile environment.

While cellular technology in a mobile environment has proliferated to enable voice communication for persons roaming across a wireless network, wireless internet access in a mobile environment is extremely limited in the cellular technology format. That is, using standard cellular frequencies and protocols, the bandwidth presented is insufficient to provide shared access to the Internet. For example, a typical bandwidth associated with cellular technology may be 144 kilobits/second which is insufficient to provide Internet access to multiple users.

In addition, the coverage provided in cellular technology is normally limited to metropolitan areas, and has limited coverage and use in more rural areas that are typical of rail or commute traffic. As such, internet traffic through cellular technology, as well as voice traffic may not be possible outside of metropolitan areas.

On the other hand, wireless communication using higher frequencies provide for increased bandwidth that is sufficient for Internet access. For instance, wireless communication using formats substantially complying with IEEE 802.11 standards provide approximately 45 megabits/second. This provides sufficient throughput in a shared environment.

However, in a mobile environment, continuous connectivity to a wireless network is hindered while roaming through a wireless network. For example, when a fast moving train is communicating with a wayside infrastructure to enable wireless communication to a wireless network, the train roams across different access points, or hotspots. The switchover time between successive access points relating to disassociating from one access point and reassociating to another access point can be measured in hundreds of milliseconds (e.g., 500 ms), a measurable amount of time. During this time, the train is disconnected from the wireless network, which creates a problem especially for mission critical applications.

SUMMARY OF THE INVENTION

Accordingly, various embodiments of the present invention disclose a method and system for hitless wireless roaming in a mobile environment. Embodiments of the present invention provide for increased throughput for wireless communication that allows Internet access on fast moving trains. Also, embodiments of the present invention provide for continuous connectivity to a wireless network as a fast moving object moves through wireless coverages provided by a plurality of access points connecting to the wireless network.

Embodiments of the present invention provide for a method and system for continuous wireless connectivity in a mobile environment. In one embodiment, a system is described that comprises a router, a first antenna, and a second antenna. The router routes Internet Protocol (IP) communication signals to and from a wireless network. The router is located on an object. A first antenna is also located on the object. The first antenna is communicatively coupled to the router for transmitting the communication signals to and from a plurality of access points on the wireless network. A second antenna is also communicatively coupled to the router for transmitting the communication signals to and from the plurality of access points.

The second antenna is positioned a distance from the first antenna on the object that allows the router continuous access to the wireless network as the first antenna and the second antenna roam through the wireless network while the object is moving. More specifically, the first antenna and the second antenna are located a distance apart that allows the router to transmit the communication signals to the wireless network through a first access point from the second antenna while a link is being established using a Mobile IP standard that communicatively couples the first antenna to a second access point while the object is moving into wireless coverage provided by the second access point.

In addition, one embodiment of the present invention disclose a method for wireless connectivity in a mobile environment. The method comprises transmitting communication signals substantially complying with an Internet Protocol (IP) wireless standard through a first antenna that is located on an object. The communication signals are transmitted to a first access point in a wireless network. The communication signals are transmitted while the object is moving along a path that is bringing the object into a second coverage zone provided by a second access point from a first coverage zone provided by the first access point.

The method then establishes a first link that communicatively couples the first antenna and the second access point using a Mobile IP standard as the object moves into the second coverage zone. While the link is being established, the method transmits the communication signals through a second antenna located on the object through the first access point to provide continuous access to the wireless network.

DETAILED DESCRIPTION OF THE INVENTION

Reference will now be made in detail to the preferred embodiments of the present invention, a method and system of hitless wireless roaming in a mobile environment, examples of which are illustrated in the accompanying drawings.

Accordingly, various embodiments of the present invention disclose a method and system for hitless wireless roaming in a mobile environment, such as, a fast moving train. Embodiments of the present invention provide for increased throughput for wireless communication that allows Internet access on fast moving objects. Embodiments of the present invention provide for continuous connectivity to a wireless network as a fast moving object moves through wireless coverages provided by a plurality of access points connecting to the wireless network.

Notation and Nomenclature

Figure 1:
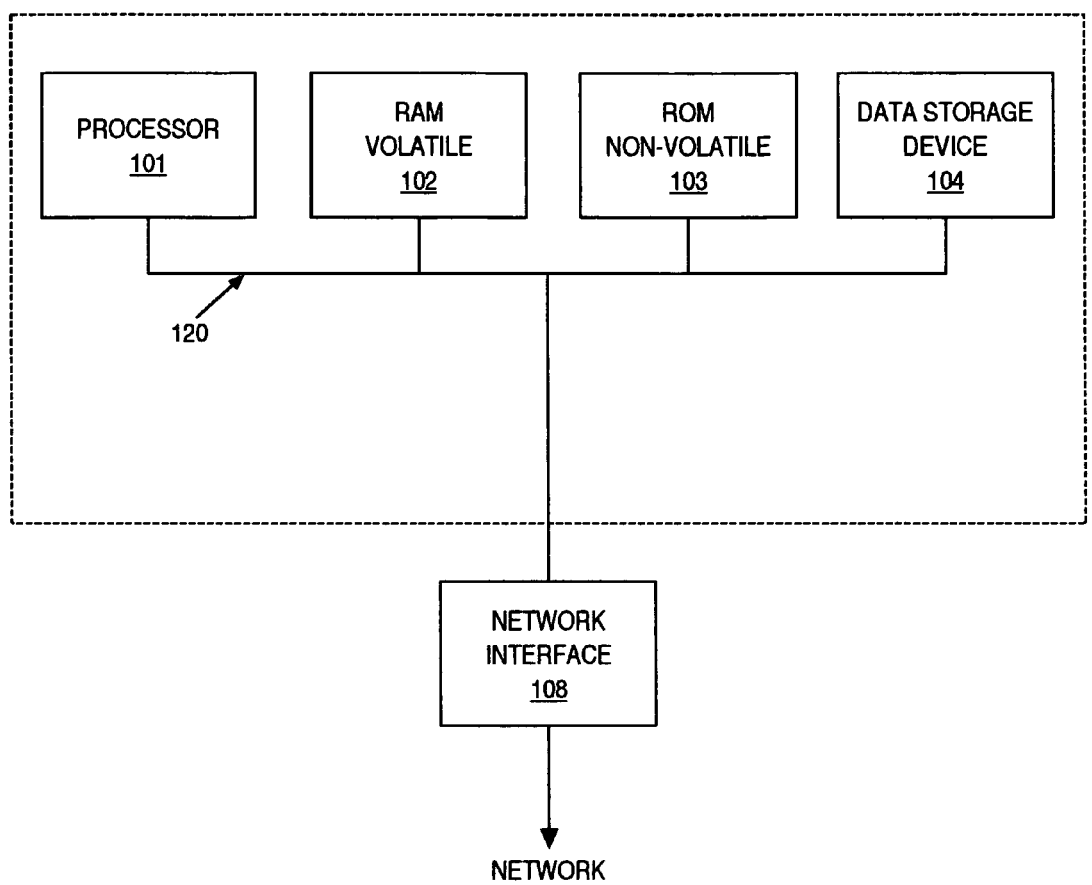
FIG. 1 is a block diagram of an electronic device that is capable of hitless wireless roaming in a mobile environment, in accordance with one embodiment of the present invention.

Referring now to FIG. 1, portions of the present invention are comprised of computer-readable and computer-executable instructions which reside, for example, in computer-readable media of an electronic system, such as, a personal computer, cell phone, personal digital assistant, server computer, mainframe, networked computer, workstation, router, and the like. FIG. 1 is a block diagram of interior components of an exemplary electronic system 100, upon which embodiments of the present invention may be implemented.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. With reference still to FIG. 1, a network interface 108 (e.g., signal input/output device) is provided which is coupled to bus 120 for providing a communication link between electronic system 100 and a network environment, such as, a wireless network environment. As such network interface 108 enables the central processor unit 101 to communicate with or monitor other electronic systems that are coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transmitting," "establishing," "detecting," "disassociating," and "reassociating," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Method and System for Hitless Wireless Roaming in a Mobile Environment

Embodiments of the present invention establish links between wireless endpoints through a Mobile Internet Protocol (IP) communication standard, such as, RFC 3344, "IP Mobility Support for IPv4." Specifically, the Mobile IP standard specifies a protocol that allows the routing of IP datagrams to mobile nodes in the Internet. In this way, communication through the Internet is possible in a mobile environment. Embodiments of the present invention are well suited to using any Mobile IP standard for establishing links between two endpoints for the purposes of communication through the Internet.

In addition, embodiments of the present invention are discussed primarily in a context in which devices and systems are coupled using wireless links through the Internet. Specifically, embodiments of the present invention are directed to communication of IP datagrams in a wireless network, and specifically with regard to devices and systems compliant with a wireless communication standard, such as, IEEE 802.11. While embodiments of the present invention are described in a wireless network communicating using an IEEE 802.11 standard, it is appreciated that other embodiments of the present invention are well suited to protocols associated with other wireless communication standards.

While embodiments of the present invention are described illustrating wireless communication in a mobile environment involving fast moving trains, other embodiments are well suited to any mobile environment using other suitable types of transportation.

Figure 2:
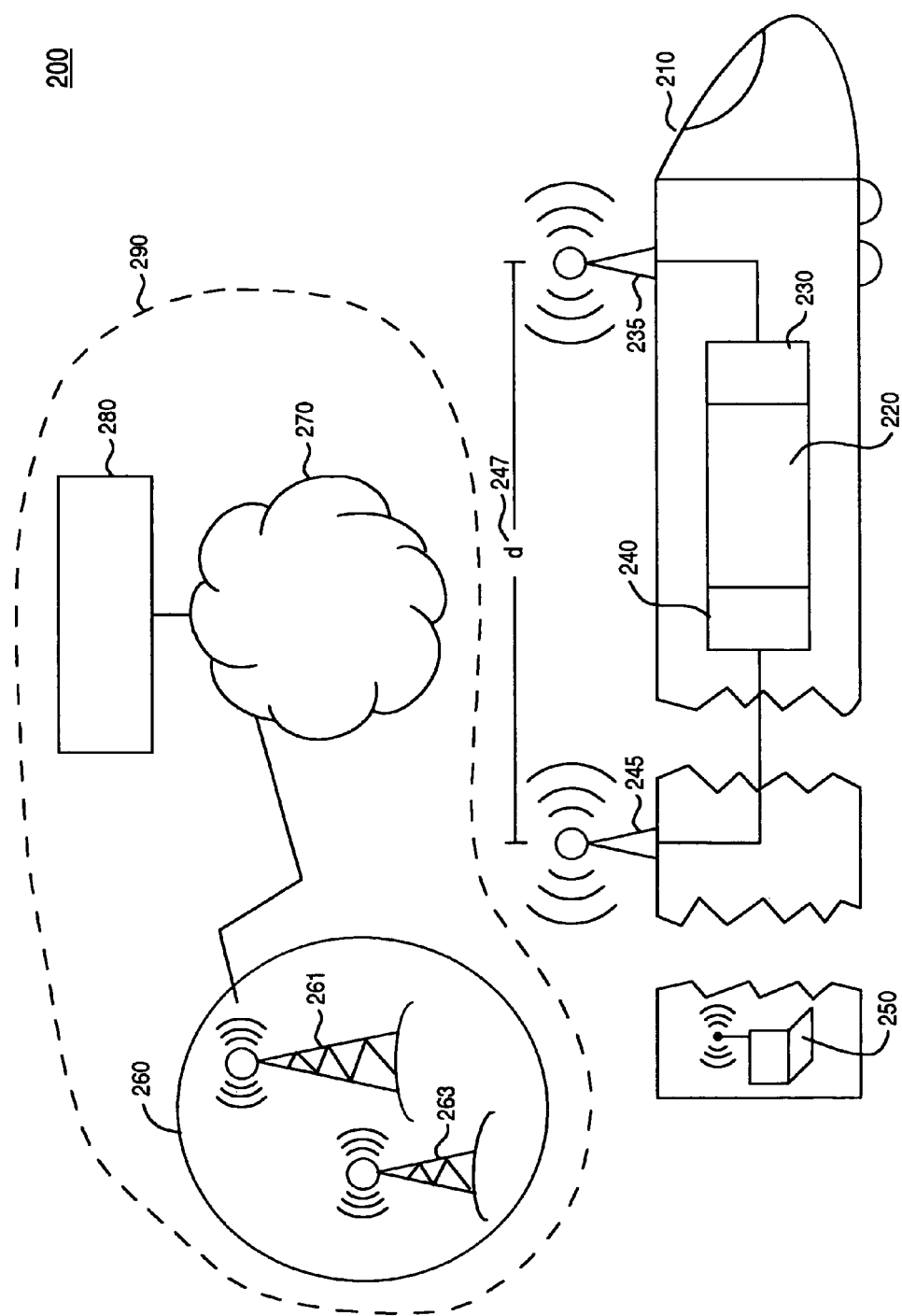
FIG. 2 is a block diagram of a system that is capable of hitless wireless roaming on fast moving trains, in accordance with one embodiment of the present invention.

Now referring to FIG. 2, a block diagram of a system 200 is shown that is capable of supporting the hitless wireless roaming in a mobile environment, in accordance with one embodiment of the preset invention. In the present embodiment, links are established between nodes in the wireless network through a Mobile Internet Protocol (IP) standard to facilitate communication through the Internet 270 in a mobile environment.

The system 200 comprises a mobile component or environment that is communicatively coupled to a more static wireless communication network. The mobile environment, as shown in FIG. 2, comprises an object, such as, a fast moving train 210 that is traveling along a rail path.

In embodiments of the present invention, the fast moving train 210 is capable of communicating with a wireless network 290 that comprises in part, a plurality of access points 260, the Internet communication network 270 and a back end server 280 that facilitates the wireless communication. The wireless network 290 as shown in FIG. 2 complies with wireless IP standards for establishing links within and to the network 290 and for transmitting IP datagrams between endpoints accessing the Internet 270. More specifically, wireless communication from the train is serviced through a backend server 280, or home agent, to provide for communication with other endpoints accessing the Internet 270.

In the wireless network 290, a plurality of access points 260, also known as hotspots, are provided to facilitate wireless communication from the train 210. In one embodiment, the plurality of access points 260 are positioned along the rail path to allow for overlapping, contiguous, or successive wireless coverage. In general, each of the plurality of access points 260 are positioned along the rail to provide for continuous access to the wireless network in embodiments of the present invention.

In some cases, successive wireless coverage do not necessarily overlap. However, embodiments of the present invention are still able to provide for continuous access to the wireless network even though there may be a small gap in wireless coverages between successive access points on the rail path.

The mobile environment of system 200 comprises a fast moving train 210 that includes a router 220, a first antenna 235, and a second antenna 245. The router is communicatively coupled to at least one wireless device (e.g., wireless device 250) to transmit communication signals following an IP standard to a wireless network. As such, the router provides for access to the wireless network 290 for wireless device 250 that is located on the train 210.

In particular, the router 220 routes communication signals substantially complying with an Internet Protocol (IP) wireless standard to and from the wireless network 290. The router is located on the fast moving train 210.

In addition, the mobile environment also comprises a first antenna 235 that is located on the fast moving train 210. The first antenna 235 is communicatively coupled to the router 220 for transmitting the communication signals to the plurality of access points in the wireless network 290. The first antenna 235 may be coupled either wirelessly or through cables to the router 220. The first antenna 235 is comprised of a highly directional antenna to provide for increased range, in one embodiment.

A wireless interface module 230 (e.g., a wireless card) provides for communicating with the wireless network 290 through the first antenna 235. That is, the wireless interface module 230 operates to communicatively couple the first antenna 235 to the wireless network 290 and to interface with the router 220 so that the router 220 can transmit communication signals to the wireless network through the first antenna 235.

In addition, the mobile environment also comprises a second antenna 245 that is communicatively coupled to the router 220 for transmitting the communication signals to the plurality of access points in the wireless network. The second antenna 245 may be coupled either wirelessly or through cables to the router 220. The second antenna 245 is comprised of a highly directional antenna to provide for increased range, in one embodiment.

A wireless interface module 240 (e.g., a wireless card) provides for communicating with the wireless network 290 through the second antenna 245. That is, the wireless interface module 240 operates to communicatively couple the second antenna 245 to the wireless network 290 and to interface with the router 220 so that the router 220 can transmit communication signals to the wirelesses network through the second antenna 245.

As shown in FIG. 2, it is possible for the router 220 to transmit communication signals to the wireless network through either the first antenna 235 or the second antenna 245, or both, at any one time. The router 220 is capable of deciding which antenna to route the communication signals to the wireless network 290.

As such, the second antenna 245 is positioned a distance "d" 247 from the first antenna 235 on the fast moving train to allow the router 220 continuous access to the wireless network 290. Continuous access is provided as the first antenna 235 and the second antenna roam through the wireless network 290 while the fast moving train is moving.

In particular, the distance "d" 247 is such the router is capable of transmitting communication signals to the wireless network 290 through a first access point from the second antenna while a link is being established using a Mobile IP standard that communicatively couples the first antenna 235 to a second access point while the fast moving train 290 object is moving into wireless coverage provided by a second access point. That is, as the fast moving train 290 is moving from wireless coverage provided by a first access point to wireless coverage provided by the second access point, the present embodiment is capable of providing continuous access to the wireless network 290.

In one embodiment, the distance "d" 247 is greater than 42 meters. That is, it is conceivable that the fast moving train 210 can travel at over 300 km/hour. Since the switchover time between access points for either antenna through their respective wireless interface modules (e.g., 230 and 240) is approximately 500 ms, the train can travel approximately 42 meters. During this period, the wireless interface module that is switching over from one access point to another access point is disconnected from the wayside infrastructure in the wireless network 290. That is, the wireless interface module that is switching over from one access point to another is incapable of transmitting IP datagrams, or communication signals.

However, by mounting two antennas, the first antenna 235 and the second antenna 245, a distance "d" 247 that is greater than 42 meters apart, the router 220 can continue transmitting IP datagrams through one or both of the antennas at any given time. In particular, while the first wireless interface card 230 associated with the first antenna 235 is switching over from one access point to another, the second wireless interface card 240 that is associated with the second antenna 245 can continue to communicate with the wireless network 290. The distance is sufficient that enough time is provided for the first wireless interface card 230 to reassociate with another access point before the second wireless interface card 240 also needs to reassociate with another access point. As such, the present embodiment leverages the length of the train in combination with the difference in the speed of propagation of electromagnetic waves versus the traveling speed of the train to provide continuous access to the wireless network 290.

Figure 3:
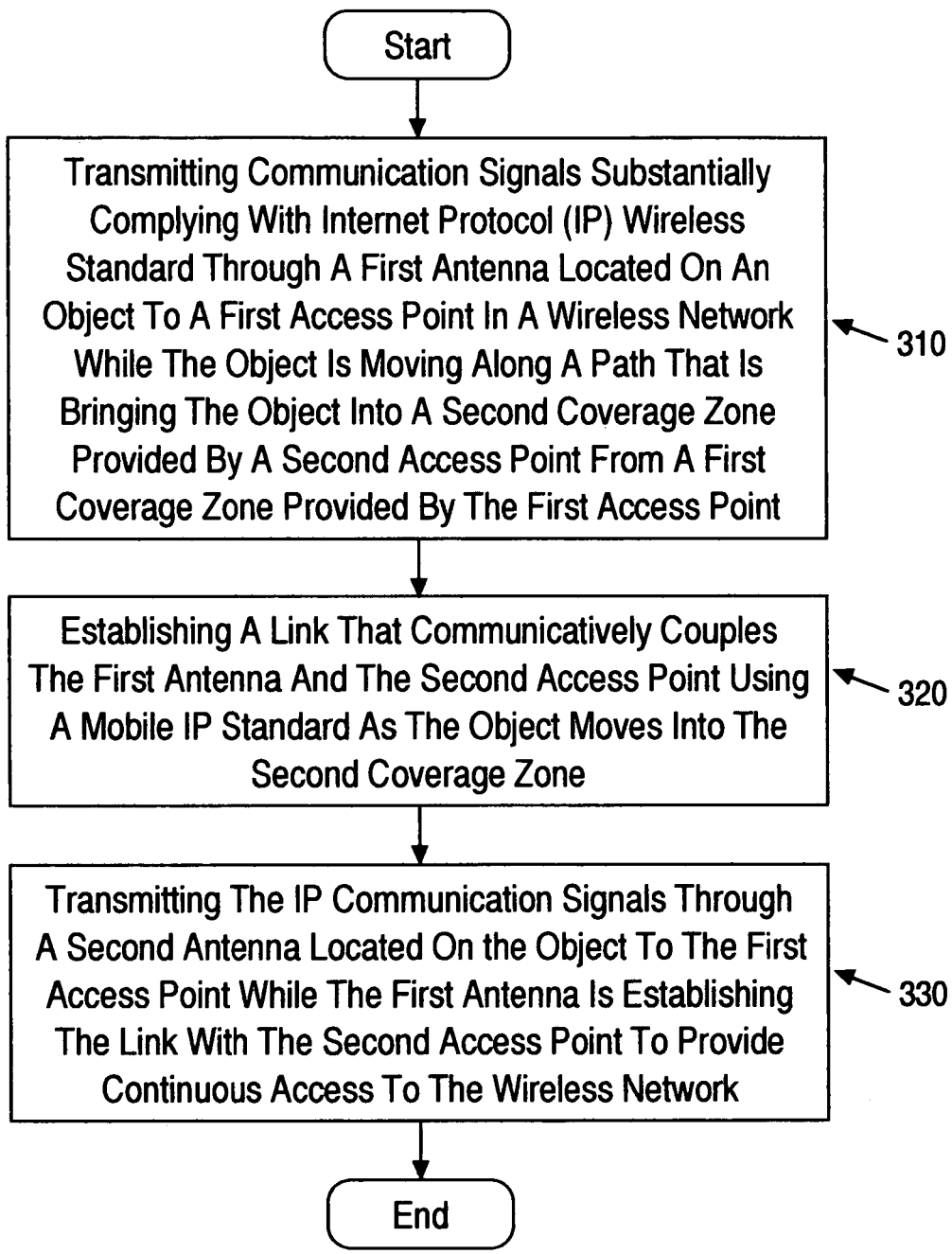
FIG. 3 is a flow diagram illustrating a computer implemented method for hitless wireless roaming in a mobile environment, in accordance with one embodiment of the present invention.

FIG. 3 is a flow diagram 300 illustrating steps in a computer implemented method for providing hitless wireless roaming in a mobile environment, in accordance with one embodiment of the present invention. The method as disclosed in flow diagram 300 is implemented using a mobile IP standard for establishing, managing, and terminating communication sessions within a communication network, in one embodiment. In addition, the method as disclosed in flow diagram 300 is implemented using a wireless IP standard for providing communication between points in a wireless network.

At 310, the present embodiment transmits communication signals substantially complying with an IP wireless standard through a first antenna located on an object to a first access point in a wireless network. In particular, the object is within a first coverage zone provided by the first access point. In one embodiment, the object is a fast moving train.

As such, a link has been previously established that communicatively couples the first antenna, or rather the wireless interface module servicing the antenna, and the first access point using the Mobile IP standard to allow for the transmission of the communication signals through the first antenna.

In one embodiment, the object is moving along a path that is bringing the object into a second coverage zone provided by a second access point from the first coverage zone provided by said first access point. That is, the object is moving away from the first coverage zone and into the second coverage zone.

At 320, the present embodiment, establishes a link that communicatively couples the first antenna and the second access point using a Mobile IP standard. This occurs as the object moves in the second coverage zone that is serviced by the second access point. While this link is being established no communication with the wireless network is possible through the first antenna.

The switchover from the first access point to the second access point by the first antenna is accomplished by disassociating the first antenna from the first access point. That is, the link that communicatively couples the first antenna and the first access point is terminated. Thereafter, the present embodiment reassociates the first antenna to the second access point using the Mobile IP standard. That is, a link is established that communicatively couples the first antenna and the second access point.

In one embodiment, the switchover is implemented after a signal strength between the first antenna and the first access point degrades below a threshold. This indicates that the object is moving away from wireless coverage provided by the first access point. As such, the present embodiment determines that a switchover is necessary for the first antenna from the first access point to the second access point for communication to continue through the first antenna as the object is moving into wireless coverage provided by the second access point.

At 330, the present embodiment transmits the communication signals through a second antenna that is located on the object to the first access point. This occurs while the first antenna is establishing the link with the second access point. The first antenna is located a distance from the second antenna on the object that allows the first antenna to switchover from the first access point to the second access point. The switchover occurs while the present embodiment maintains another link that communicatively couples the second antenna with the first access point for transmitting the communication signals while the object is moving. In this way, continuous access is provided to the wireless network for wireless devices located on the object that is moving.

Previously, a link has been established that communicatively couples the second antenna, or rather the wireless interface module servicing the second antenna, and the first access point using the Mobile IP standard to allow for the transmission of communication signals through the second antenna.

In another embodiment, as the object moves fully into the second coverage zone provided by the second access point, the second antenna must undergo a switchover to the second access point to provide for continuous access to the wireless network. That is, the present embodiment establishes a link that communicatively couples the second antenna and the second access point using said Mobile IP standard as the object moves into the second coverage zone. During this switchover from the first access point to the second access point by the second antenna, or more particularly, by the wireless interface module servicing the second antenna, the present embodiment transmits communication signals through the first antenna to the second access point to provide continuous access to the wireless network. The switchover for the second antenna to the second access point is accomplished before the first antenna moves out of coverage provided by the second access point.

Figure 4:
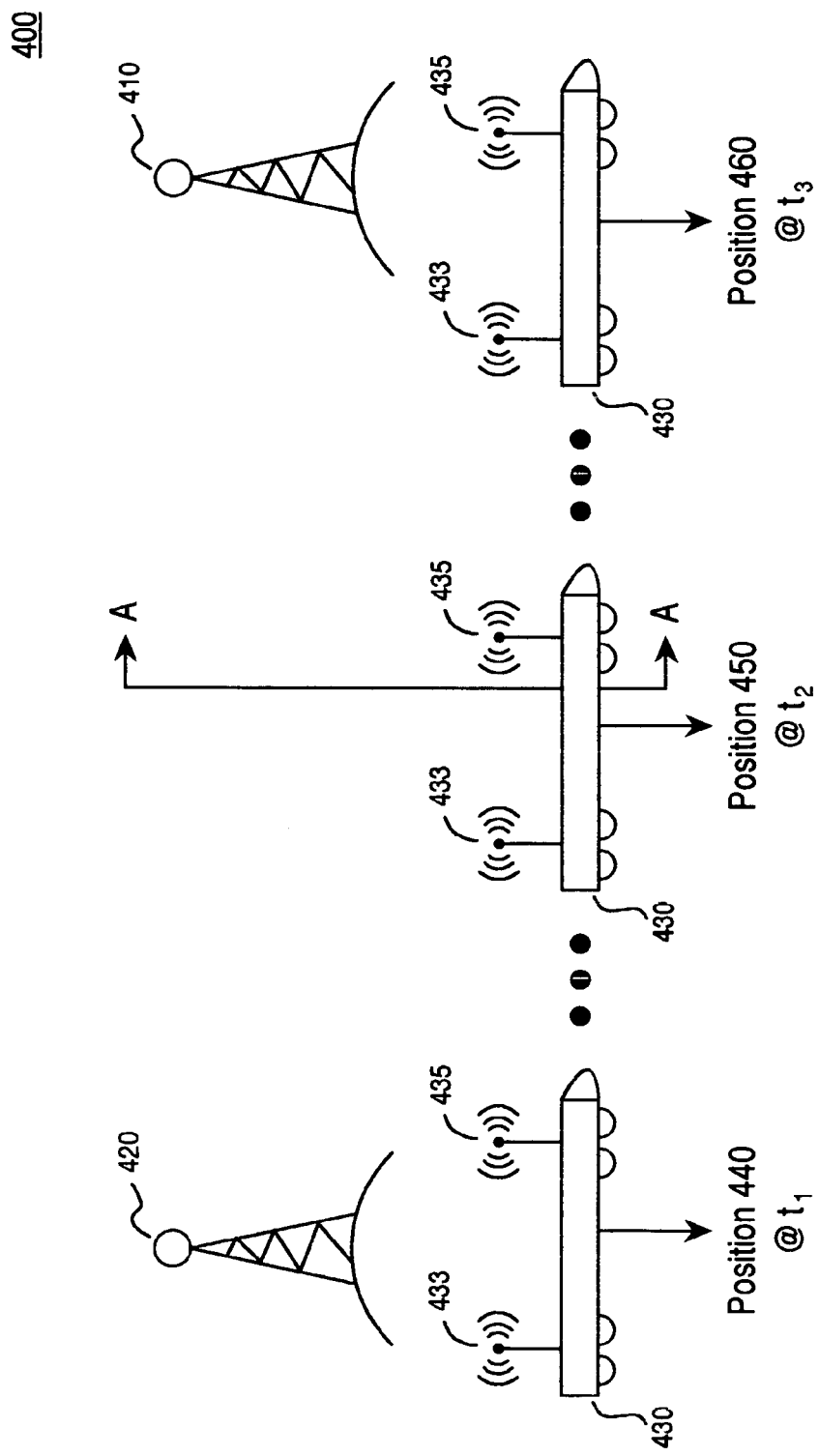
FIG. 4 is a time flow diagram illustrating the process of switching over to a new access point while maintaining continues coverage to a wireless network, in accordance with one embodiment of the present invention.

Now referring to FIG. 4, a time flow diagram 400 is shown illustrating the process by which hitless wireless roaming is achieved in a mobile environment, in accordance with one embodiment of the present invention. The time flow diagram 400 provides snapshots of three different times for a fast moving train 430 as the train 430 moves from wireless coverage provided by an access point 420 to wireless coverage provided by access point 410. The wireless coverage provided by the access point 420 is shown to the left of line A—A. The wireless coverage provide by the access point 430 is shown to the right of line A—A.

At time $t_1$, the time flow diagram 400 illustrates the fast moving train 430 at a position 440. At position 440, the train 430 can communicate with the wireless network through two antennas, antenna 435 and antenna 433. That is, the antenna 435 has a link that communicatively couples the antenna 435 with the access point 420. Also, the antenna 433 has a link that communicatively couples the antenna 433 with the access point 420.

At time $t_2$, the time flow diagram 400 illustrates the fast moving train 430 at a position 450. At position 450 the train is moving out of the coverage provided by the access point 420 and moving into the coverage provided by the access point 410. That is, antenna 433 still has the link that communicatively couples the antenna 433 to the access point 420. As such, the train 430 can access the wireless network through the antenna 433 and the access point 420.

On the other hand, at time $t_2$, the antenna 435 no longer can communicate with the access point 420. As such, the antenna 435 must switchover from access point 420 to the access point 410. In FIG. 4, at position 450, the antenna 435 is switching over to access point 410 and cannot transmit IP datagrams. However, the train can still access the wireless network through antenna 433 and the access point 420.

At time $t_3$, the time flow diagram 400 illustrates the fast moving train 430 at position 460. At position 460, the train 430 can access the wireless network through both antennas 433 and 435. That is, after moving past the boundary shown by line A—A, the present embodiment performs a switchover for antenna 433. As such, the antenna 433 is switching over from access point 420 to access point 410. During this time, the train can still access the wireless network through antenna 435 and the access point 410. At position 460, after the antenna 433 has switched over to the access point 410, the train can access the wireless network through either antenna 433 or 435. In this way, the present embodiment provides for continuous access to the wireless network as the train 430 is moving from one access point to another access point.

Accordingly, various embodiments of the present invention disclose a method and system for hitless wireless roaming in a mobile environment, such as, a fast moving train. Embodiments of the present invention provide for increased throughput for wireless communication that allows Internet access on fast moving objects. Embodiments of the present invention provide for continuous connectivity to a wireless network as a fast moving object moves through wireless coverages provided by a plurality of access points connecting to the wireless network.

While the methods of embodiments illustrated in flow chart 300 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for hitless wireless roaming in a mobile environment are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A system for wireless connectivity in a mobile environment, comprising:
   a router for routing communication signals substantially complying with an Internet Protocol (IP) wireless standard to and from a wireless network, wherein said router is located on an object;
   a first antenna located on said object communicatively coupled to said router for transmitting said communication signals to and from a plurality of access points on said wireless network and located outside of said moving object;
   a second antenna communicatively coupled to said router for transmitting said communication signals to and from said plurality of access points, wherein said second antenna is positioned a distance from said first antenna on said object that allows said router continuous access to said wireless network as said first antenna and said second antenna roam through said wireless network when switching between access points providing contiguous coverage in said wireless network while said object is moving.

2. The system of claim 1, wherein said distance is such that allows said router to transmit said communication signals to said wireless network through a first access point from said second antenna while a link is being established using a Mobile IP standard that communicatively couples said first antenna to a second access point while said object is moving into wireless coverage provided by said second access point.

3. The system of claim 1, wherein said first access point and said second access point provide successive wireless coverage along a path said object is moving.

4. The system of claim 1, wherein said distance is greater than 42 meters.

5. The system of claim 1, wherein said object comprises a train.

6. The system of claim 1, wherein said first antenna and said second antenna comprise highly directional antennas.

7. The system of claim 1, wherein said IP wireless standard substantially complies with the IEEE 802.11 communication standard.

8. The system of claim 1, wherein said router transmits said communication signals to a backend server in said wireless network.

9. The system of claim 1, wherein said router is communicatively coupled to at least one wireless device located on said object that generates and receives said communication signals.

10. A method for wireless connectivity in a mobile environment, comprising:
    transmitting communication signals substantially complying with an Internet Protocol (IP) wireless standard through a first antenna located on an object to a first access point in a wireless network while said object is moving along a path that is bringing said object into a second coverage zone provided by a second access point from a first coverage zone provided by said first access point, wherein said first access point and said second access point are located outside of said object;
    establishing a link that communicatively couples said first antenna and said second access point using a Mobile IP standard as said object moves into said second coverage zone; and
    transmitting said communication signals through a second antenna located on said object to said first access point while said first antenna is establishing said link with said second access point to provide continuous access to said wireless network.

11. The method of claim 10, further comprising:
    establishing another link that communicatively couples said first antenna and said first access point using said Mobile IP standard to allow said transmitting communication signals through said first antenna.

12. The method of claim 10, wherein said establishing a link further comprises:
    disassociating said first antenna from said first access point in another link that communicatively couples said first antenna and said first access point; and
    reassociating said first antenna to said second access point in said link using said Mobile IP standard.

13. The method of claim 10, wherein said establishing a link further comprises:
    detecting a signal strength between said first antenna and said first access point has dropped below a threshold thereby necessitating a switchover to said second access point for communications through said first antenna.

14. The method of claim 10 further comprising:
    establishing another link that communicatively couples said second antenna and said first access point using said Mobile IP standard to facilitate said transmitting said communication signals through said second antenna.

15. The method of claim 10, further comprising:
transmitting said communication signals to said wireless network using an IP standard substantially complying with IEEE 802.11.

16. The method of claim 10, further comprising:
establishing another link that communicatively couples said second antenna and said second access point using said Mobile IP standard as said object moves into said second coverage zone; and
transmitting said communication signals through said first antenna to said second access point while said second antenna is establishing said another link with said second access point to provide continuous access to said wireless network.

17. The method of claim 10, further comprising:
locating said first antenna a distance from said second antenna on said object that is greater than 42 meters.

18. The method of claim 10, further comprising:
locating said first antenna a distance from said second antenna on said object that allows said first antenna to switchover from said first access point to said second access point while maintaining another link that communicatively couples said second antenna with said first access point for transmitting said communication signals while said object is moving.

19. The method of claim 10, wherein said object comprises a train.

20. A computer system, comprising:
a processor; and
a computer readable memory coupled to said processor and containing program instructions that, when executed, implement a method for wireless connectivity in a mobile environment, comprising:
transmitting communication signals substantially complying with an Internet Protocol (IP) wireless standard through a first antenna located on an object to a first access point in a wireless network while said object is moving along a path that is bringing said object into a second coverage zone provided by a second access point from a first coverage zone provided by said first access point, wherein said first access point and said second access point are located outside of said object;
establishing a link that communicatively couples said first antenna and said second access point using a Mobile IP standard as said object moves into said second coverage zone; and
transmitting said communication signals through a second antenna located on said object to said first access point while said first antenna is establishing said link with said second access point to provide continuous access to said wireless network.

21. The computer system of claim 20, wherein said method further comprises:
establishing another link that communicatively couples said first antenna and said first access point using said Mobile IP standard to allow said transmitting communication signals through said first antenna.

22. The computer system of claim 20, wherein said establishing a link in said method further comprises:
disassociating said first antenna from said first access point in another link that communicatively couples said first antenna and said first access point; and
reassociating said first antenna to said second access point in said link using said Mobile IP standard.

23. The computer system of claim 20, wherein said establishing a link in said method further comprises:
detecting a signal strength between said first antenna and said first access point has dropped below a threshold thereby necessitating a switchover to said second access point for communications through said first antenna.

24. The computer system of claim 20, wherein said method further comprises:
establishing another link that communicatively couples said second antenna and said first access point using said Mobile IP standard to facilitate said transmitting said communication signals through said second antenna.

25. The computer system of claim 20, wherein said method further comprises:
transmitting said communication signals to said wireless network using an IP standard substantially complying with IEEE 802.11.

26. The computer system of claim 20, wherein said method further comprises:
establishing another link that communicatively couples said second antenna and said second access point using said Mobile IP standard as said object moves into said second coverage zone; and
transmitting said communication signals through said first antenna to said second access point while said second antenna is establishing said another link with said second access point to provide continuous access to said wireless network.

27. The computer system of claim 20, wherein said method further comprises:
locating said first antenna a distance from said second antenna on said object that is greater than 42 meters.

28. The computer system of claim 20, wherein said method further comprises:
locating said first antenna a distance from said second antenna on said object that allows said first antenna to switchover from said first access point to said second access point while maintaining another link that communicatively couples said second antenna with said first access point for transmitting said communication signals while said object is moving.

29. The computer system of claim 20, wherein said object comprises a train.

30. A computer readable medium containing executable instructions which, when executed in a processing system, causes the system to perform the steps for wireless connectivity in a mobile environment, comprising:
transmitting communication signals substantially complying with Internet Protocol (IP) wireless standard through a first antenna located on an object to a first access point in a wireless network while said object is moving along a path that is bringing said object into a second coverage zone provided by a second access point from a first coverage zone provided by said first access point, wherein said first access point and said second access point are located outside of said object;
establishing a link that communicatively couples said first antenna and said second access point using a Mobile IP standard as said object moves into said second coverage zone; and
transmitting said IP communication signals through a second antenna located on said object to said first access point while said first antenna is establishing said link with said second access point to provide continuous access to said wireless network.

31. The computer readable medium of claim 30, wherein said method further comprises:

establishing another link that communicatively couples said first antenna and said first access point using said Mobile IP standard to allow said transmitting IP communication signals through said first antenna.

32. The computer readable medium of claim 30, wherein said method further comprises:

transmitting said communication signals to said wireless network using an IP standard substantially complying with IEEE 802.11.

33. The computer readable medium of claim 30, wherein said method further comprises:

establishing another link that communicatively couples said second antenna and said second access point using said Mobile IP standard as said object moves into said second coverage zone; and transmitting said communication signals through said first antenna to said second access point while said second antenna is establishing said second communication session with said second access point to provide continuous access to said wireless network.

34. The computer readable medium of claim 30, wherein said method further comprises:

locating said first antenna a distance from said second antenna on said object that is greater than 42 meters.

35. The computer readable medium of claim 30, wherein said method further comprises:

locating said first antenna a distance from said second antenna on said object that allows said first antenna to switchover from said first access point to said second access point while maintaining another link that communicatively couples said second antenna with said first access point for transmitting said communication signals while said object is moving.

36. The computer readable medium of claim 30, wherein said object comprises a train.

* * * * *